(12) United States Patent
Lee et al.

(10) Patent No.: US 7,260,081 B2
(45) Date of Patent: Aug. 21, 2007

(54) METHOD FOR RESOLVING COLLISIONS IN COMMUNICATION SYSTEMS USING MEDIUM ACCESS CONTROL BASED ON CONTENTION

(75) Inventors: Nam-Suk Lee, Cheollabuk-do (KR); Nam-Hoon Park, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 992 days.

(21) Appl. No.: 10/606,528

(22) Filed: Jun. 26, 2003

(65) Prior Publication Data

US 2004/0100986 A1 May 27, 2004

(30) Foreign Application Priority Data

Nov. 27, 2002 (KR) .................. 10-2002-0074313

(51) Int. Cl.
H04B 7/212 (2006.01)
(52) U.S. Cl. .................. 370/348; 370/447; 370/462
(58) Field of Classification Search ............ 370/322, 370/329, 338, 337, 346–348, 458, 461, 432, 370/442–449; 455/525, 517, 450, 451, 452.1, 455/452.2, 463, 464
See application file for complete search history.

(56) References Cited

U.S. PATENT DOCUMENTS 5,960,000 A * 9/1999 Ruszczyk et al. ........... 370/447
6,115,390 A * 9/2000 Chuah ....................... 370/443

FOREIGN PATENT DOCUMENTS

| JP | 10-291633 | 10/1998 |
| KR | 1019960053728 | 11/1996 |

OTHER PUBLICATIONS

ETSI TS 101 761-1 V1.1.1 (Apr. 2000), pp. 54 and 55.
2002 IEEE, "Fixed Collision Rate Back-off Algorithm for Wireless Access Networks", C. Li, et al., 5 pages.

* cited by examiner

*Primary Examiner*—Doris H. To
*Assistant Examiner*—Ian N. Moore
(74) *Attorney, Agent, or Firm*—Blakely Sokoloff Taylor & Zafman

(57) ABSTRACT

A method for resolving a collision in a communication system using medium access control based on contention. The method enables management and control of a contention window size of each mini slot and thus all the terminals may have an equal opportunity to access each mini slot. Moreover, when two or more terminals have simultaneously attempted to access any one mini slot and thus collision has occurred in the mini slot, the method restricts the access of the mini slot to the terminal or terminals that had experienced collision, and then permits an access attempt of another terminal after all the terminals which had experienced collision succeed in accessing a mini slot.

9 Claims, 3 Drawing Sheets

METHOD FOR RESOLVING COLLISIONS IN COMMUNICATION SYSTEMS USING MEDIUM ACCESS CONTROL BASED ON CONTENTION

CROSS REFERENCE TO RELATED APPLICATION

This application is based on Korea Patent Application No. 10-2002-0074313 filed on Nov. 27, 2002 in the Korean Intellectual Property Office, the content of which is incorporated herein by reference.

BACKGROUND OF THE INVENTION (a) Field of the Invention

The present invention relates to a method for resolving collisions in communication systems using medium access control based on contention, where the media access control is used to reserve or require communication resources in a mobile terminal. More specifically, the present invention relates to a method for resolving collisions.

(b) Description of the Related Art

In a mobile communication system, a terminal reserves communication resources or requests the same from a base station or a remote host (also referred to as "base station" hereinafter). To support this function, the base station allocates mini slots and broadcasts the number and the location of the mini slots to all the terminals. In this case, each of the terminals competitively attempts to access the mini slots by using a media access control method. At this time, when the number of terminals that are accessing a certain mini slot is two or more, a collision arises in the mini slot and the access attempt results in failure. Therefore, the base station inspects whether a collision has arisen in the mini slots and broadcasts the inspected information to all the terminals by incorporating the inspected information into a header of a frame.

In such a media access control method, a prior art called a BEB (Binary Exponential Back-off) method is known to resolve a collision. The BEB method is performed in all the terminals. Each terminal receives broadcasting information incorporated in the header of a present frame and confirms through the broadcasting information whether an access attempted in a previous frame into a certain mini slot has been successful. According to the BEB method, when a certain terminal continues to fail in access attempts, the number of access attempts shall be assumed to be an integer 'a'. In these circumstances, when $2^a$ is less than or equal to the number of mini slots (N), any integer value k is selected by using a uniform distribution from 1 to N. Here, the integer value k is less than or equal to the value allowable in the communication system. When $2^a$ is larger than the number of mini slots (N), the integer value k is selected by using a uniform distribution from 1 to $2^a$. Then, a count operation of mini slots starts at a current frame, and the $k^{th}$ mini slot is accessed.

In the above BEB method, when the re-access number of the terminals increases due to a collision, access of the terminals to the mini slots can be dispersed by delaying a re-access opportunity of the corresponding terminal until the count operation started at any mini slot of a current frame arrives at the $k^{th}$ mini slot. This results in resolution of collisions. However, this method has a problem in that as more attempts at re-access occur, the time to wait for access increases. Therefore, there is an opportunity for access priority to be given to a terminal that has attempted access, but this leads to an inequality problem. Further, in the case that many terminals attempt to access, the possibility of collision increases even though the access attempts of the terminals have been dispersed by using the BEB method.

A method using a contention window has been known as another attempt to resolve the above-described collision in the communication system. In the method using a contention window, a base station incorporates the number of mini slots and a variable contention window size (referred to as 'CW' hereinafter) into a header of a frame, and broadcasts the header to each of the terminals. Each of the terminals selects a certain integer k from the constant distribution between 1 to CW, and when k is less than or equal to N, all terminals can access their $k^{th}$ mini slot. Otherwise, the terminal delays access of the mini slots to the next frame. This method can solve the inequality problem because all the terminals can perform the access operation equally. However, the method still has a problem in that the greater the number of terminal access attempts, the more the possibility of collision increases.

Meanwhile, a relevant prior art of application No. 10-1996-0053728 was filed with the Korean Intellectual Property Office under the title "A multiple access control method in a radio data communication network" on Nov. 13, 1996. In the prior art, a transmission medium is accessed by mixing reservation and contention to access communication resources in accordance with various traffic characteristics, and to thereby increase channel efficiency in radio communication. However, the prior art relates to a method of controlling medium access by mixing reservation and contention techniques, while the present invention relates to a method for reducing collision in a communication system using medium access control based on contention. Therefore, the present invention has a different technical purpose and solution from the prior art.

SUMMARY OF THE INVENTION

It is an advantage of the present invention to provide a method for resolving collisions in a communication system using medium access control based on contention, so that a possibility of collision may decrease even though a total number of terminals increases.

In one aspect of the present invention, the method for resolving collisions in a base station of a communication system using medium access control based on contention comprises:

(a) initializing a contention window size and a status value;

(b) broadcasting information on a total number of mini slots and a contention window size to each terminal;

(c) receiving information on an access attempt to a corresponding mini slot from a terminal or terminals for resource allocation;

(d) determining whether each terminal has experienced a collision from the information on the mini slots received in (c);

(e) setting the contention window size and the status value based on whether the contention window size is "0" or not when it is determined in (d) that any one or more terminals have experienced a collision; and (f) setting the contention window size and the status value in response to a decrease in a number of terminals competing for access in the case that the corresponding mini slot has been successfully accessed, and for setting the contention window size and the status value so as to permit an access attempt of another terminal or terminals in the case that the corresponding mini slot has not been accessed and the contention window size is smaller than or equal to "0" when a collision has not occurred in (d).

In another aspect of the present invention, the method for resolving a collision in each terminal of a communication system using medium access control based on contention comprises:

(a) receiving a total number of mini slots and a contention window size of each mini slot from a base station;

(b) selecting any one mini slot for an access attempt and determining whether a contention window size corresponding to the selected mini slot is "0";

(c) abandoning accessing the selected mini slot and standing by for the next frame when the contention window size is not "0" in (b);

(d) attempting to access the selected mini slot when the contention window size is "0" in (b), and receiving the total number of mini slots and a contention window size of each mini slot from a base station;

(e) determining whether the contention window size received in (d) is "0" or is smaller than the contention window size in the previous frame; and (f) determining that access to the selected mini slot has been successful when the contention window size is "0" or is smaller than the contention window size of the previous frame in (e), and otherwise of competing with other terminals that had experienced a collision, so as to attempt re-access to the selected mini slot.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

The present invention may be applicable to all communication systems using medium access control based on contention, but the detailed description of the present invention in this specification will be given for a mobile communication system.

Figure 1:
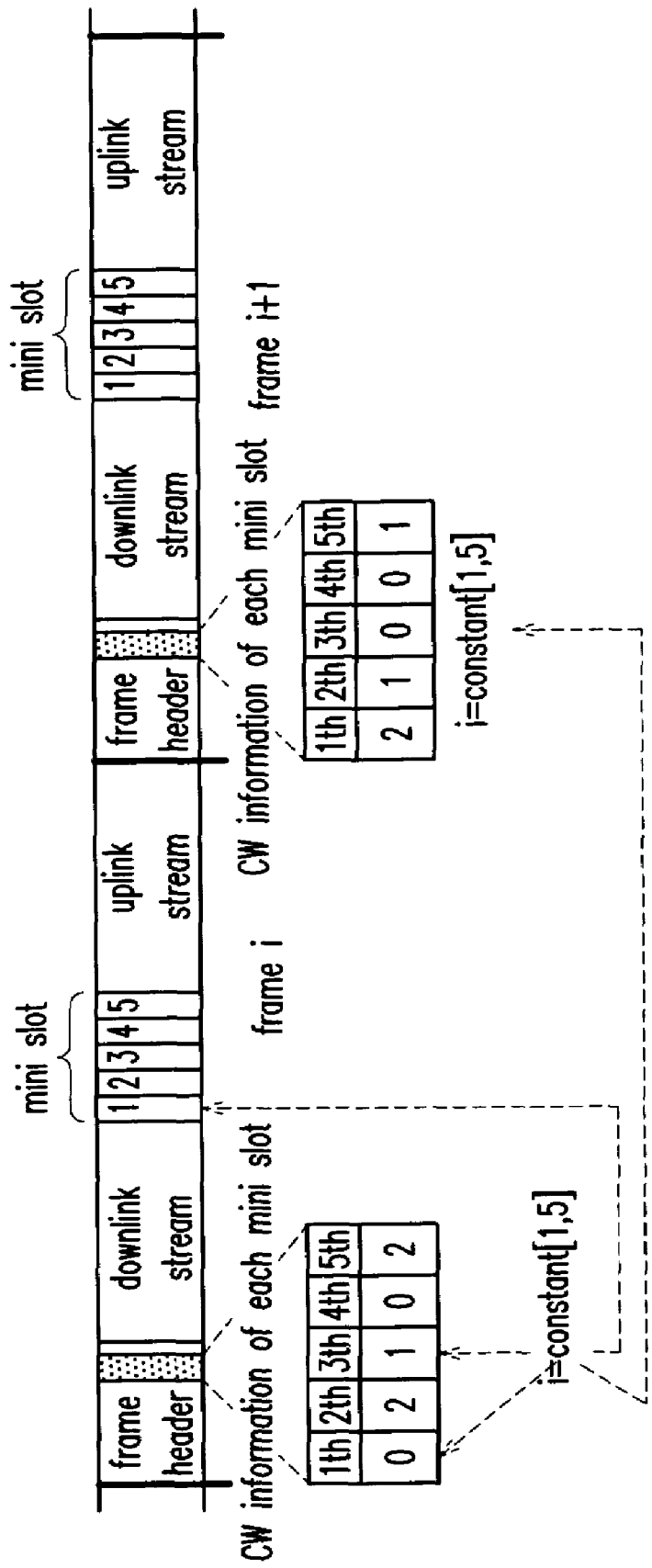
FIG. 1 shows an example of each mini slot with contention window in accordance with the present invention.

In a mobile communication system, a base station performs uplink and downlink management of communication resources. As shown in FIG. 1, one frame includes a frame header, a plurality of mini slots, CW (contention window) information of each mini slot, a downlink stream, and an uplink stream. Through the downlink stream, the base station allocates communication resources required for data transmission and transmits data to each terminal. Through the uplink stream, each terminal is allocated communication resources from the base station and transmits data for communication. Moreover, each terminal accesses a mini slot of the frame and transmits a resource request message to the base station, and collisions occur when two or more terminals attempt to access a mini slot. Accordingly, the base station receives a mini slot and determines whether or not a collision has occurred. The determination result is incorporated into the frame header and is broadcasted to corresponding terminals.

As shown in FIG. 1, the base station of the present invention manages the contention window size of each mini slot, incorporates the number of mini slots (N) and contention window sizes (CW) into the frame header, and the frame header is broadcasted to each terminal. Each terminal receives an allocation of communication resources to transmit data. Each terminal selects a predefined variable value i of from 1 to N by using a constant distribution. When the value of the contention window size (CW) in the i-th mini slot is zero, the terminal attempts to access the i-th mini slot. Otherwise, the terminal stands by until the next frame. Hereinafter, it is assumed that the symbol "CWi" represents the contention window size in the i-th mini slot. When two or more terminals have simultaneously attempted to access the i-th mini slot in a previous frame and a collision occurs as a result of these attempts, only the attempting terminals may be permitted to access the i-th mini slot in the present frame. In this case, when the value between 1 and CWi selected by using the constant distribution is "1", the corresponding terminal accesses the i-th mini slot. The base station controls the value of the contention window size (CWi). More specifically, when all the terminals that have experienced collision in attempting to access the i-th mini slot succeed to accessing a corresponding mini slot, the base station sets the contention window size (CWi) to "zero". Then, another terminal may access the corresponding mini slot.

Figure 2:
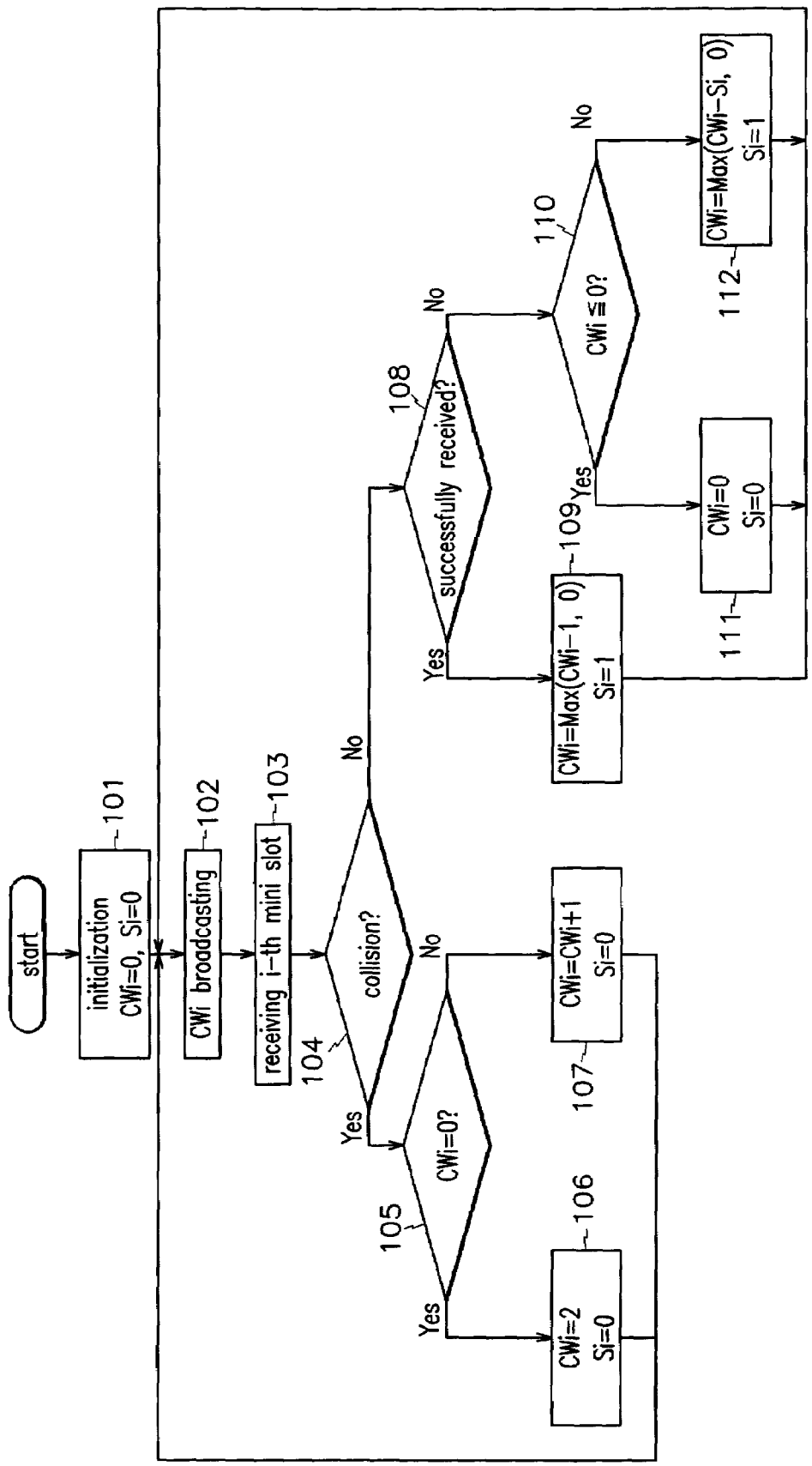
FIG. 2 shows a procedure in a base station or a host computer which controls or manages the contention window of each mini slot in accordance with the present invention.
Figure 3:
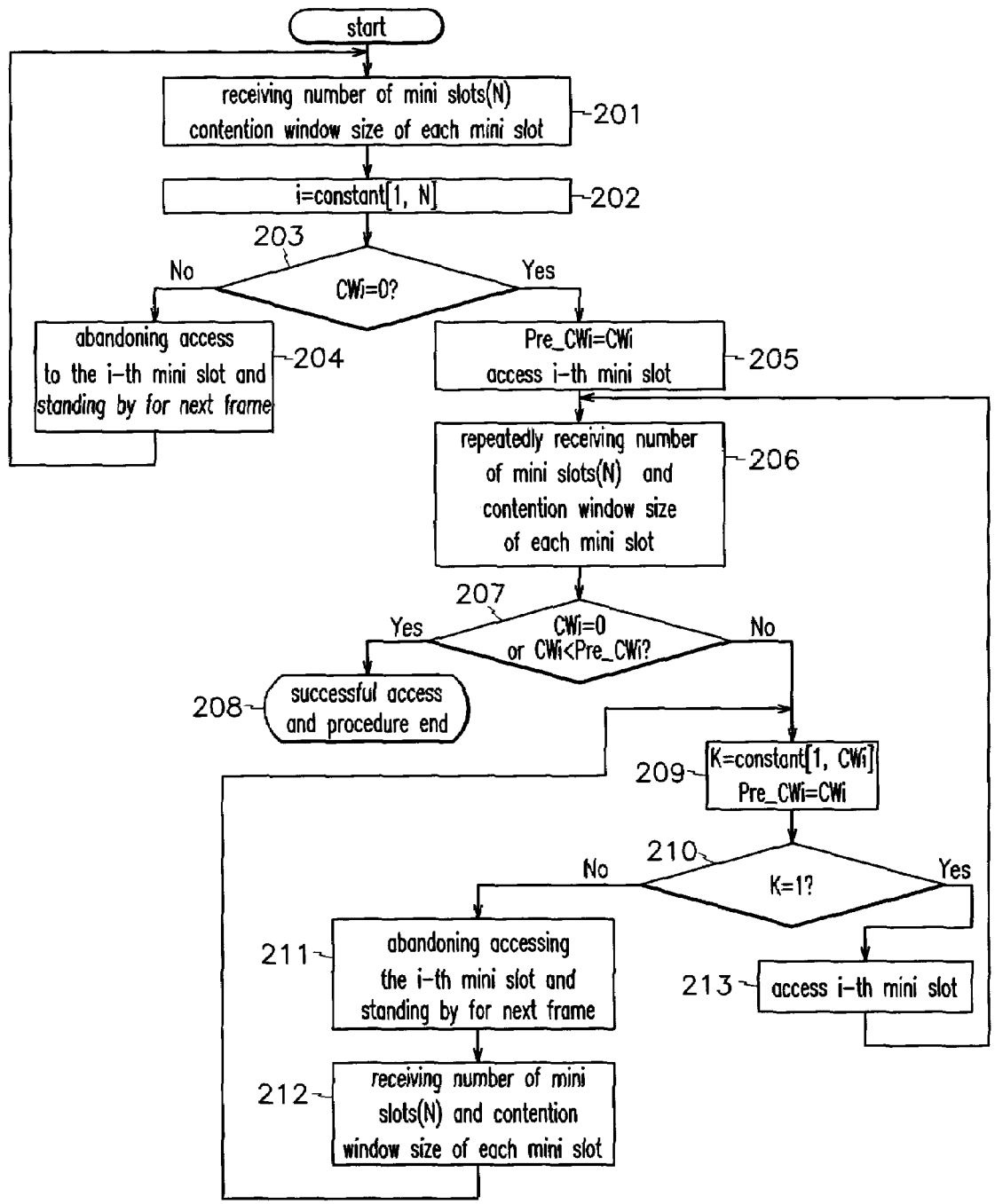
FIG. 3 shows a procedure in a terminal for accessing any one mini slot in accordance with the present invention.

With reference to FIG. 2 and FIG. 3, a method for resolving collisions in a communication system using medium access control based on contention will be described. The method for resolving collisions in accordance with the present invention may be comprised of functions performed in a base station and each terminal. A control procedure in the base station is illustrated in FIG. 2, and a control procedure in each terminal is illustrated in FIG. 3.

As shown in FIG. 2, when operation of the base station starts, each contention window size (CWi) and status value of a previous frame (Si) are respectively initialized to "zero" (step 101). The total number of mini slots (N) and the contention window size (CWi) are broadcasted into each terminal (step 102). Then, a terminal or terminals that desire to receive allocation of communication resources select any mini slot and attempt to access the selected mini slot. In response to this attempt, the base station receives i-th mini slot (step 103). The base station determines from the received information of the i-th mini slot whether or not a collision has occurred (step 104). When a collision has occurred in the above step 104, the base station determines whether the contention window size (CWi) is zero (step 105). When the contention window size (CWi) is zero in the step 105, it is assumed that two or more terminals have accessed the i-th mini slot. Then, the contention window size (CWi) is set to "2" and the status value (Si) is set to "0" (zero) (step 106). When the contention window size (CWi) is not zero in the step 105, it is assumed that a collision has occurred among the terminals that were permitted to access the i-th mini slot. Then, the contention window size (CWi) is incremented by "1" and the status value (Si) is set to "0" (step 107). After the steps 106 and 107 have been completed, the control procedure jumps back to the step 102, where information on the contention window size (CWi) is broadcasted to each terminal. In this case, the status value (Si) represents values on collision, unemployment, and successful reception of the i-th mini slot in the previous frame.

When a collision has not occurred in the step 104, the base station determines whether the i-th mini slot has been successfully (step 108). When the base station has received the i-th mini slot, it is assumed that one terminal that was competing with other terminals for access to the i-th mini slot has been excluded. Then, the contention window size (CWi) is set to the maximum value between "0" (zero) and (CWi-1) and the status value (Si) is set to "1" (step 109). When the base station has not received the i-th mini slot successfully in the step 108, it is assumed that no terminal has attempted to access the i-th mini slot and thus the unused i-th mini slot has been received in the base station. In this case, the base station determines whether the contention window size (CWi) is smaller than "0" or equal to "0" (step 110). When the contention window size (CWi) is smaller than "0" or equal to "0" in the step 110, the contention window size (CWi) and the status value (Si) are both set to "0" so as to permit access of another terminal or terminals (step 111). When the contention window size (CWi) is larger than "0" in the step 110, it is assumed that a terminal or terminals that are competing for access to the i-th mini slot currently exist. Then, the contention window size (CWi) is set to the maximum value between "0" and (CWi-Si) and the status value (Si) is set to "1" (step 112). This means that when a collision has occurred at the i-th mini slot in the previous frame, the status value (Si) is "0" and two or more terminals are competing for access to the i-th mini slot. Further, since the i-th mini slot is not being used in the present frame, decreasing the contention window size (CWi) with no delay increases the probability of collision in the next frame. Therefore, it is preferable to maintain the present contention window size (CWi) at it is. On the other hand, when the i-th mini slot in the previous frame has not been received or used successfully, the status value (Si) is "0" and it is preferable to decrease the contention window size (CWi) by "1".

After steps 109, 111, and 112 have been completed, the control procedure jumps back to the step 102. Then, information on the contention window size (CWi) is broadcasted to each terminal.

Next, with reference to FIG. 3, a control procedure in each terminal will be described.

As shown in FIG. 3, when operation of each terminal starts, each terminal receives the number of mini slots (N) and the contention window size of each mini slot from a base station (step 201). Next, each terminal selects a value i between 1 and N with a constant distribution so as to select a mini slot for access (step 202). Then, each terminal determines whether the contention window size (CWi) of the i-th mini slot is "0" (step 203), and when the contention window size (CWi) of the i-th mini slot is not "0", the corresponding terminal abandons access to the i-th mini slot and stands by for the next frame (step 204). This is because another terminal has attempted to access the i-th mini slot. By these principals, even if the number of terminals increases, the contention for access between each terminal may be dispersed since the access attempt is determined by analyzing the contention window size of each mini slot.

When the contention window size (CWi) of the i-th mini slot is "0", the corresponding terminal allocates the present contention window size (CWi) to a previous contention window size variable (pre_CWi) so as to store the present contention window size (CWi). Further, the corresponding terminal attempts to access the i-th mini slot so as to transmit a resource request message (step 205). Then, the corresponding terminal repeatedly receives the number of mini slots (N) and the contention window size (CWi) of each mini slot from the base station (step 206), and it determines, on the basis of received information on the contention window size (CWi), whether the contention window size (CWi) is "0" or smaller than the previous contention window size (pre_CWi) (step 207). When the contention window size (CWi) is "0" or smaller than the previous contention window size (pre_CWi), it is assumed that the access to the i-th mini slot that had been attempted in the previous frame is successful, and the control procedure ends (step 208). When the given condition in the step 207 has not been satisfied, it is assumed that a collision between terminals has occurred. Therefore, access to the i-th mini slot should be restricted to terminals that have experienced collision since the contention window size (CWi) is larger than "0". The corresponding terminal sets the present contention window size (CWi) to the previous contention window size (pre_CWi) and selects a value of k between 1 and CWi with a constant distribution (step 209). Then, the corresponding terminal determines whether the value of k is "1" (step 210), and when it is, the corresponding terminal attempts to access the i-th mini slot (step 213) and the control procedure returns to the step 206. By performing the steps below the step 206, the result of the attempted access to the i-th mini slot may be confirmed through the contention window size (CWi) received from the base station. When the value of k is not "1" in the step 210, the corresponding terminal abandons its attempt to access the i-th mini slot and stands by for the next frame (step 211). Then, the corresponding terminal receives the number of mini slots (N) and the contention window size (CWi) of each mini slot so as to again perform the steps following the step 209 in the next frame.

As described above, the method according to the present invention is applied to the communication system using medium access control based on contention. The method of the present invention enables management and control of any contention window size of each mini slot, and thus all the terminals may have an equal opportunity to access each mini slot. More specifically, even though the possibility of collision may increase due to an increase in the number of terminals, the method of the present invention provides an effect that may disperse access competition among the terminals. This is because when any mini slot has been selected, it becomes possible to attempt to access the mini slot only in the case that the contention window size of the selected mini slot is "0". Moreover, when two or more terminals have simultaneously attempted to access any one mini slot and thus a collision has occurred, the method of the present invention restricts the access of the mini slot to the terminal or terminals that have experienced collision and only permits an access attempt of another terminal after all the terminals that experienced the collision succeed in accessing a mini slot. By these circumstances, the method of the present invention may disperse access competition among terminals that attempt to access a mini slot.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for resolving collisions in a base station of a communication system using medium access control based on contention, comprising:

at said base station:
(a) initializing a contention window size and a status value;
(b) broadcasting information on a total number of mini slots and a contention window size to each terminal;
(c) receiving corresponding mini slot in response to access attempt of any terminal or terminals for resource allocation;
(d) determining whether each terminal has experienced a collision, from the information on the mini slots received in (c);
(e) setting the contention window size and the status value based on whether the contention window size is "0" or not when it is determined in (d) that any one or more terminals have experienced a collision; and
(f) setting the contention window size and the status value in response to a decrease in a number of terminals competing for access in the case that the corresponding mini slot has been successfully received and for setting the contention window size and the status value so as to permit an access attempt by another terminal or terminals in the case that the corresponding mini slot has been received with unused state and the contention window size is smaller than or equal to "0" when a collision has not occurred in (d).

2. The method according to claim 1, wherein said contention window size in (e) and (f) has been broadcasted to each terminal in (b).

3. The method according to claim 1, wherein said contention window size is set to "2" and said status value is set to "0" in the case that said contention window size is "0" in (e), while said contention window size is incremented by "1" and said status value is set to "0" in the case that said contention window size is not "0" in (e).

4. The method according to claim 1, wherein steps from (a) through (f) are performed in a unit of a frame and each frame includes a frame header, a plurality of mini slots, contention window information of each mini slot, a downlink stream, and an uplink stream.

5. The method according to claim 1, wherein said contention window size and said status value are respectively set to "0" when said contention window size is smaller than or equal to "0", while said contention window size is set to a maximum value between "0" and "contention window size—status value" and said status value is set to "1" when said contention window size is larger than "0".

6. A method for resolving a collision in each terminal of a communication system using medium access control based on contention, comprising:

at said terminal:
(a) receiving a total number of mini slots and a contention window size of each mini slot from a base station;
(b) selecting any one mini slot for an access attempt and determining whether a contention window size corresponding to the selected mini slot is "0";
(c) abandoning accessing of the selected mini slot and standing by for a next frame when the contention window size is not "0" in (b);
(d) attempting to access the selected mini slot when the contention window size is "0" in (b), and receiving the total number of mini slots and a contention window size of each mini slot from the base station;
(e) determining whether the contention window size received in (d) is "0" or is smaller than the contention window size in a previous frame; and
(f) determining that access to the selected mini slot has been successful when the contention window size is "0" or is smaller than the contention window size of the previous frame in (e), and otherwise of competing with other terminals that had experienced a collision, so as to attempt re-access to the selected mini slot.

7. The method according to claim 6, when the contention window size is not "0" or smaller than the contention window size of the previous frame, wherein (f) performs:

determining a value of a variable and for setting the contention window size of the present frame as a contention window size of the previous frame;
determining whether the variable value is "1";
accessing the selected mini slot when the variable value is "1"; and
abandoning accessing the selected mini slot and standing by for the next frame when the variable value is not "1".

8. The method according to claim 7, wherein the access result may be confirmed through the contention window size received from the base station, by jumping to (e) after performing the access to the selected mini slot.

9. The method according to claim 7, wherein the variable value is selected from a constant number between "1" and the contention window size.

* * * * *